March 9, 1937.    L. FINKELSTEIN    2,072,872
APPARATUS FOR TESTING FILTERS
Filed Oct. 31, 1933    2 Sheets-Sheet 1

INVENTOR.
LEO FINKELSTEIN
BY Millard F. Peake, Jr.
ATTORNEY.

March 9, 1937.  L. FINKELSTEIN  2,072,872
APPARATUS FOR TESTING FILTERS
Filed Oct. 31, 1933   2 Sheets-Sheet 2

INVENTOR.
LEO FINKELSTEIN
BY Millard F. Peake, Jr.
ATTORNEY.

Patented Mar. 9, 1937

2,072,872

UNITED STATES PATENT OFFICE 2,072,872

APPARATUS FOR TESTING FILTERS

Leo Finkelstein, Baltimore, Md.

Application October 31, 1933, Serial No. 696,051

4 Claims. (Cl. 73—51)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to an apparatus for testing filters, and more particularly to smoke filters used with gas masks.

In order to render air contaminated with noxious gases and smokes suitable for breathing, it is common practice to equip each person with a gas mask having its air inlet connected to an air purifying filter. These filters are usually positioned within a canister having an air inlet and an outlet nipple adapted to be connected to an air hose leading to the gas mask. These filters must be uniformly efficient in removing smokes and gases passed therethrough.

One object of this invention is to provide an apparatus for testing the efficiency of filters against smoke.

Another object of this invention is to provide a compact testing apparatus for gas mask filters against smoke which may be readily operated by an unskilled workman for rapid and efficient testing.

Another object of this invention is to provide an apparatus for testing gas mask filters against an smoke which is very sensitive and whereby the efficiency of a filter to the passage of smoke therethrough may be measured with a degree of accuracy not heretofore attainable.

Another object of this invention is to provide a testing apparatus for gas mask filters in which the filter to be tested is readily secured in testing position by a manually operated device which simultaneously operates the testing mechanism.

These and various other objects of this invention will be apparent to those skilled in the art from the following description and appended claims, with the understanding that the several necessary elements comprising this invention may be varied in construction, proportion and arrangements, without departing from the spirit and scope of the invention.

In order to make my invention more clearly understood, I have shown in the accompanying drawings means for carrying the same into practical effect, without limiting the improvements in their useful applications to the particular constructions which for the purpose of explanation have been made the subject of illustration.

As more fully hereinafter described in detail, this invention includes an apparatus for generating smoke at a definite rate, with means to pass the smoke through a filter being tested. The quantity of smoke passed through the filter is a measure of the efficiency of the filter. The smoke passing through the filter is accurately measured by a very sensitive device using a light sensitive cell, the light reflected and/or refracted by the smoke particles changing the electrical property of the cell.

Figure 1:
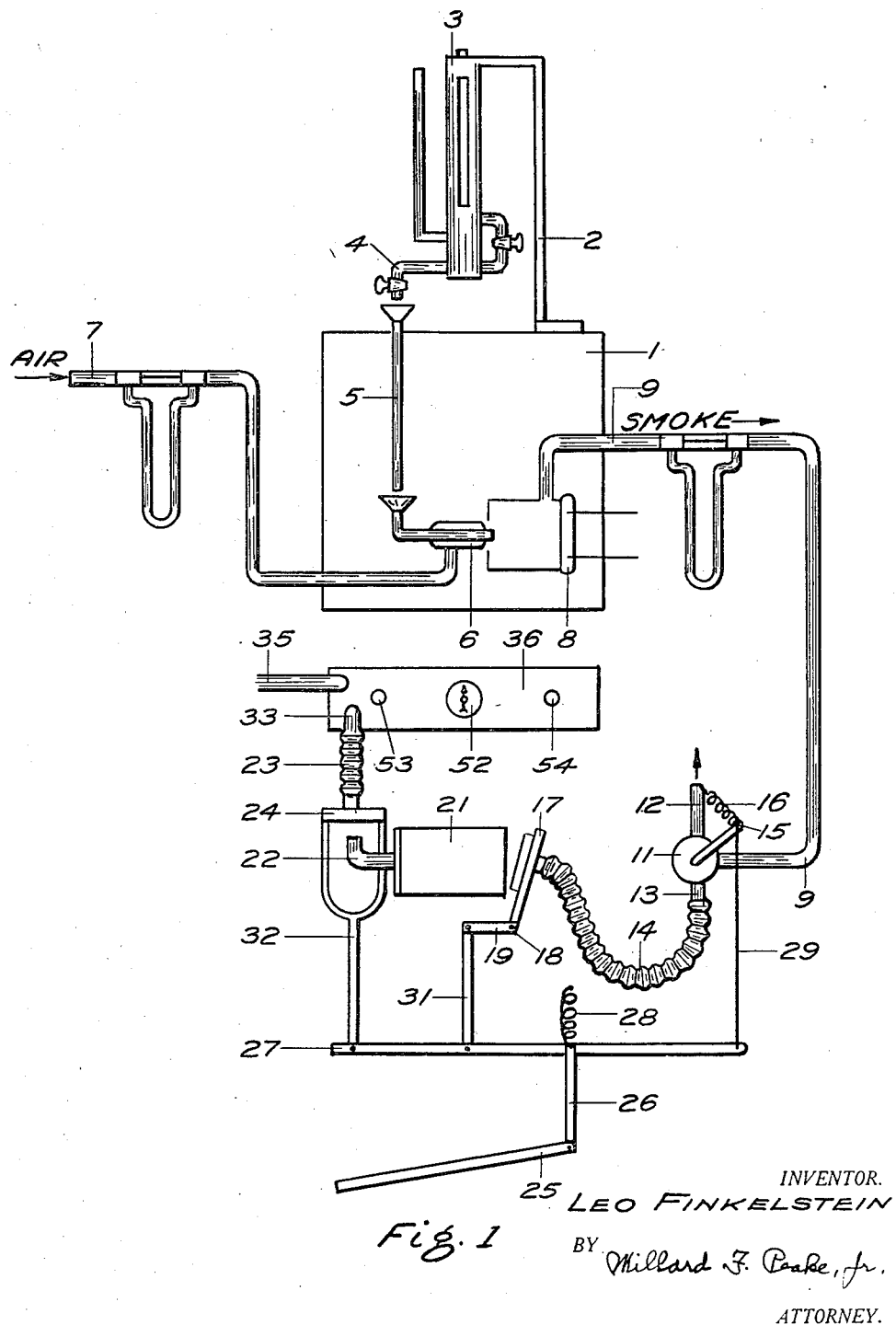
Fig. 1 is a diagrammatic view of the complete testing apparatus.

Referring to the drawings wherein like characters indicate like parts, and particularly Fig. 1, a smoke generating box 1 has a bracket 2 supporting an oil dropping reservoir 3, whereby oil may be dropped from pipe 4 into the flared mouth of pipe 5 at a constant rate. This oil passes into the atomizer 6, air being supplied from pipe 7. In order that the smoke may be generated at a constant rate and have a constantly even texture, the quantity of air admitted to the atomizer 6 is constant. In one form of apparatus, an air flow of 30 liters per minute has been found satisfactory.

The atomized oil is directed against an electrically heated plate 8, the resulting smoke being drawn out of the smoke box through pipe 9. Smoke is delivered through pipe 9 at a constant rate. Tests have demonstrated that 50 liters per minute is a satisfactory rate of delivery of smoke but it will be understood that the quantity and kind of smoke may be varied to suit the test being conducted.

Pipe 9 is connected to a three-way valve 11, one outlet 12 thereof being connected to a suction pump, and one outlet 13 having a flexible pipe 14 secured thereto. The operating handle 15 of the valve is normally biased by spring 16 to connect smoke pipe 9 to the suction pump outlet 12, in order that smoke being continuously generated may not collect in the pipes and thus cause an inaccurate test.

Flexible pipe 14 is connected to a head 17 which is pivoted at 18 and has lever 19 thereon. The head 17 is adapted to tightly fit against the bottom of a gas mask canister 21 containing the filter element to be tested. Each canister has an outlet nipple 22 which can be connected to a pipe 23 leading to the test cabinet. Pipe 23 has a reciprocatory head 24 adapted to tightly engage over the pipe nipple 22.

It is desirable that a large number of canisters 21 be tested and this apparatus is arranged to facilitate the connection, test, and disconnection of canisters. A foot treadle 25 is connected by rod 26 to vertically movable bar 27, normally biased upward by a spring 28. A wire 29 is connected to bar 27 and to handle 15 of the valve 11. A rod 31 also connects bar 26 to the pivoted bell crank lever 19 of head 11. A fork-headed member 32 is secured to bar 27 and head 24 of pipe 23. By these connections, it will be apparent that depression of the foot treadle 25, will cause valve 11 to connect smoke pipe 9 to outlet 13, will cause head 17 to rotate counter-clockwise about pivot 18 to close the lower end of the filter canister, and will connect head 24 of pipe 23 to the outlet of the canister.

Pipe 23 is connected to inlet 33 of box 34 of the test cabinet 36 in which the amount of smoke passing through the filter is accurately measured. A pipe 35 is connected to a suction pump so that a predetermined suction may be placed on the filter outlet.

Figure 2:
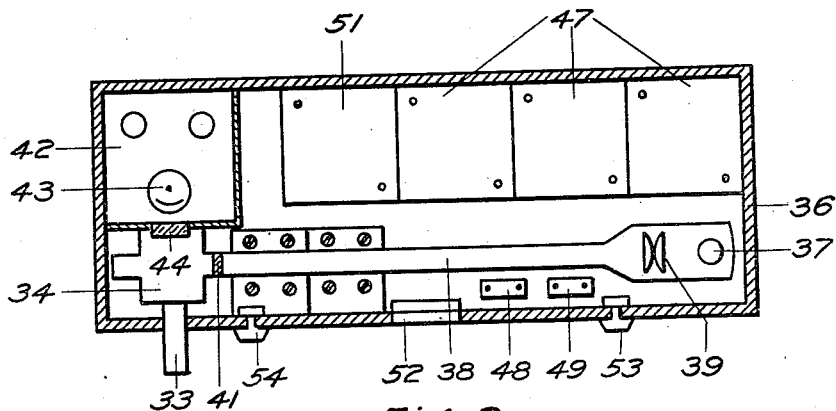
Fig. 2 is a partly diagrammatic view of the testing cabinet.

The amount of smoke passing through the box 34 (see Fig. 2) is measured electrically, and is registered upon a galvanometer suitably calibrated for filter efficiency. An electric lamp 37 is placed in a light ray tunnel 38 having lens 39 therein. This tunnel 38 is connected to box 34 with a glass 41 interposed therebetween to prevent smoke from entering the tunnel. Within an adjoining compartment 42 is a photo-electric cell 43 positioned adjacent a glass 44 which separates smoke box 34 from compartment 42.

It will be noted that the photo-electric cell 43 is not placed in the direct path of the light beam from lamp 37. It has been found that the obscuring power of the smoke which passes through these filters is insufficient to give an accurate indication of the efficiency of the filter. This is true even of those filters which are not fully protective against poisonous smokes. With the arrangement of the light sensitive cell to one side of the beam of light, only the light which is reflected and/or refracted by the minute smoke particles impinges upon the cell. This gives a very sensitive reading for the smoke in box 34, and inefficient filters which would not be detected by a test depending upon the obscuring power of the smoke are readily noted and discarded.

Figure 3:
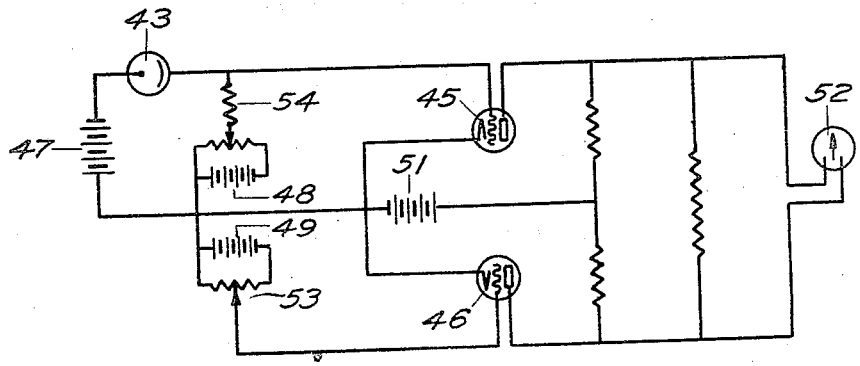
Fig. 3 shows the electrical circuit arrangement.

The photo-electric cell 43 is connected to a direct coupled amplifier circuit of the balanced type as shown in Fig. 3. This circuit includes the three element or four element tubes 45 and 46, batteries 47, 48, 49, and 51, with the cell 43 connected in the grid circuit of tube 45. A galvanometer 52 is mounted in the front of cabinet 36, and potentiometer control knobs 53 and 54 are placed adjacent thereto. The variations in electric current in cell 43 due to variations in light impinging thereon are amplified in a well known manner and are registered on galvanometer 52.

The operation of this system and apparatus will be understood from the above description. Each canister to be tested is placed as shown in Fig. 1 and the foot treadle 25 is pressed. The heads 17 and 24 move to engage the canister, making smoke and gas tight connections, and valve 11 is moved to allow the smoke to be drawn through the canister. The amount of smoke passing through the filter in the canister passes through box 34 and the light which is reflected and/or refracted by the smoke serves to vary the current in the cell 43. Such variation in current is indicated on the galvanometer. When the foot treadle is released the parts return to the position shown in Fig. 1, whereby the smoke being constantly generated in smoke box 1 is drawn out of outlet 12 of the valve and there is no accumulation of smoke in box 1 or pipe 9. Furthermore, air is drawn through the released head 24, pipe 23, and smoke box 34, to purge these parts of smoke. Thus when another canister is inserted in position for test, the apparatus is clear of smoke from prior tests, and each test is accurate.

It will be understood that the invention is not limited to a photo-electric cell, as a selenium cell or other light sensitive element may be substituted therefor. The circuit may be varied in a number of different ways, for example, in Fig. 3, the dummy tube 46, may be replaced by a suitable resistance, or various single tube circuits may be used. More amplification may be obtained by the use of additional stages, either by direct coupling or by a resistance capacitance circuit using a suitable light interrupter so that a pulsating current may be obtained.

While I have shown and described the preferred embodiments of my invention, I wish it to be understood that I do not confine myself to the precise details of construction herein set forth by way of illustration, as it is apparent that many changes and variations may be made therein by those skilled in the art without departing from the spirit of the invention or exceeding the scope of the appended claims.

I claim:

1. In an apparatus for successively testing a plurality of filters, a smoke conduit, a box for measuring the smoke passed through a filter, an entrance conduit and a suction pipe connected to said box, movable heads on said entrance conduit and said smoke conduit for engagement with the exit and inlet of a filter, and manually operable means for simultaneously engaging said heads with a filter to be tested.

2. The invention as defined in claim 1 wherein a normally closed valve is interposed in the smoke conduit, and means for opening said valve simultaneously with engagement of said heads with the filter.

3. Apparatus for accurately testing gas mask filters for smoke penetration comprising a smoke generator, a smoke conduit connected thereto, means for generating a beam of light, a light sensitive cell adjacent to but out of the path of the beam of light, a suction pipe for drawing smoke laden gas through a filter under test and through the beam of light, and means for clamping a filter between the suction pipe and smoke conduit.

4. In an apparatus for successively testing gas mask filters for smoke penetration, a smoke conduit, a device for measuring the smoke passing through a filter under test, a valve in said smoke conduit, and means for simultaneously connecting a filter between said smoke conduit and said device and opening said valve.

LEO FINKELSTEIN.